UNITED STATES PATENT OFFICE.

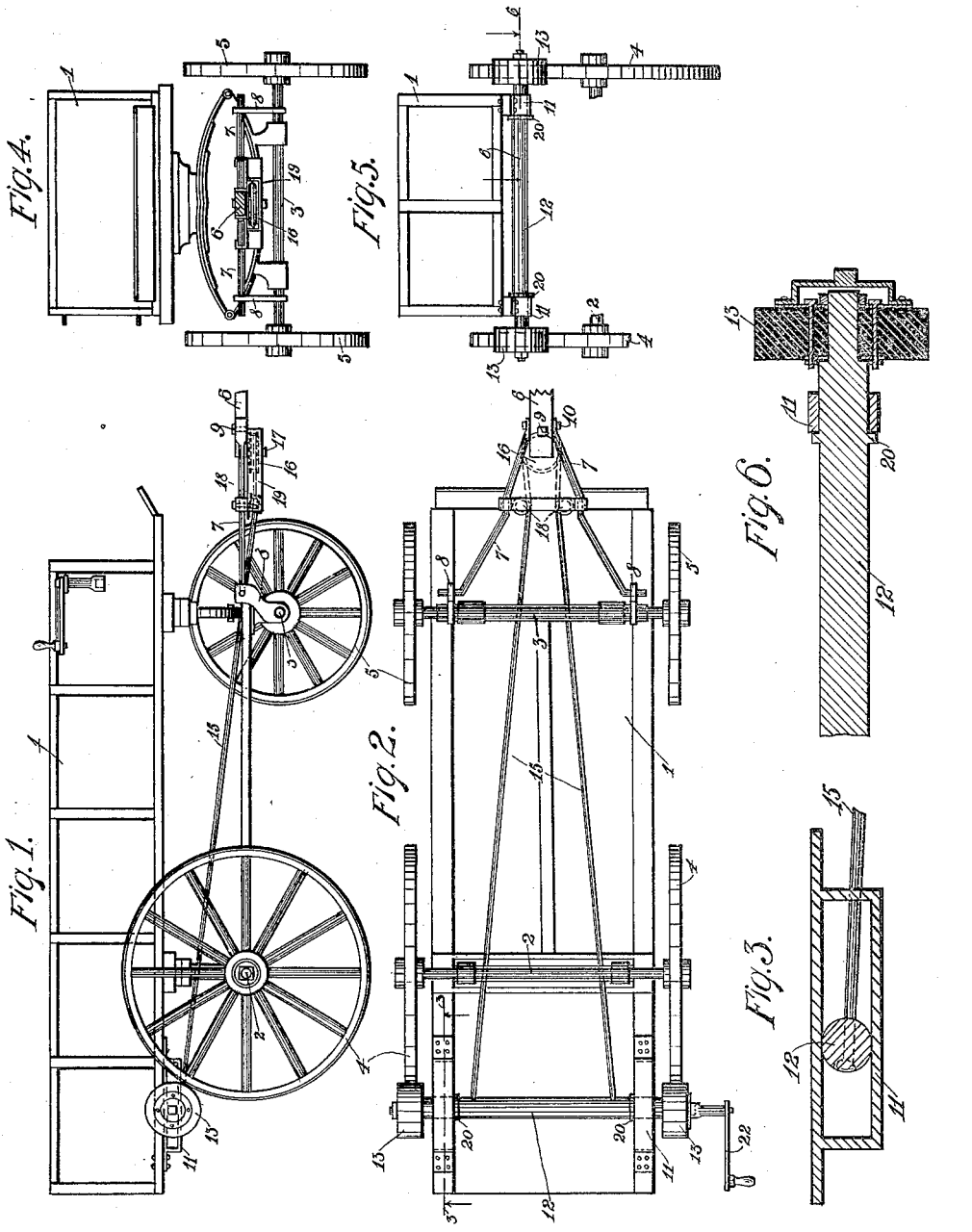

JOSEPH HAGEL, OF CHICAGO, ILLINOIS.

ATTACHMENT FOR VEHICLES.

1,125,516.  Specification of Letters Patent.  Patented Jan. 19, 1915.

Application filed January 26, 1914. Serial No. 814,286.

*To all whom it may concern:*

Be it known that I, JOSEPH HAGEL, a citizen of the United States, residing at Chicago, in the county of Cook and State of Illinois, have invented certain new and useful Improvements in Attachments for Vehicles, of which the following is a specification.

The essential object of this invention is to provide certain new and useful improvements in attachments for vehicles, and the invention is intended to permit the application of a certain amount or proportion of the power of the draft animals to the rear end of the vehicle and to the rear wheels thereof, instead of exerting the draft effect entirely at the forward end thereof.

In the drawings, Figure 1 is a side elevation of a vehicle equipped with this invention; Fig. 2 is a bottom plan view of the vehicle shown in Fig. 1; Fig. 3 is a section on the line 3—3, Fig. 2; Fig. 4 is a front elevation looking toward the left, Fig. 1; Fig. 5 is a rear elevation looking toward the right, Fig. 1; and Fig. 6 is a section on the line 6—6, Fig. 5.

The vehicle body 1 bears the rear axle 2 and front axle 3, and said axles in turn carry the wheels 4 and 5, all of which are connected to the vehicle and otherwise constructed in a well known manner. The wagon tongue 6 upon which the pull of the horses or other animals is exerted, is secured by the hounds 7 to the ears 8 which are connected to the front axle and in this manner the forward pull upon the tongue 6 is communicated to the front axle as heretofore. The whiffletrees (not shown) are secured to the tongue 6 by the bolt 9 or in any other convenient manner, and the hounds 7 are secured to the tongue 6 by the bolt 10, thus providing the necessary pivotal mounting for the tongue. Beneath the bed of the body 1 are the stirrups 11, there being one such member on each side of the vehicle, and in said stirrups the rod or shaft 12 is secured. At its outer ends said shaft 12 bears the rollers 13 which are preferably mounted upon shaft 12 with a ball-bearing or suitable anti-friction device, and the rollers 13 are adapted to engage the rear wheels 4. A strong chain 15 is secured at its ends in any suitable manner to the rod or shaft 12, and said chain 15, as best shown in Fig. 2, extends to the front end of the vehicle, being looped over the pulley 16, which is secured by bolt 17 to that end of the tongue 6 which is nearest the wagon. The chain 15 is guided by other pulleys 18 which may be set at and inclined to the horizontal as shown in Fig. 1. Pulleys 17 and 18 are conveniently retained within a suitable frame 19 secured beneath the tongue 6, hounds 7, and fastened to the tongue and the hounds in any convenient manner. The rod or shaft 12 is provided with a bead 20 which engages the stirrup 11 to prevent sidewise motion of the member 12 and thus keep the roller 13 bearing upon the tire or rim of the wheel 4.

When a forward pull (toward the right, Figs. 1 and 2) is being exerted upon the tongue 6 (or such other form of shaft as may be conveniently used) that pull is communicated by means of the hounds 7 and ears 8 to the front axle 3. Simultaneously, that forward pull upon the tongue 6 is communicated by the flexible member 15 to the rod or bar 12 and, hence, through the rollers 13 to the rear wheels 4. By means of the pulley 16 flexible member 15, rod 12, and rollers 13, a part of the forward pull upon the tongue 6 is exerted directly upon the rear wheels 4.

As best shown in Fig. 3, the stirrup 11 is of sufficient length to permit considerable play to the roller-bearing shaft 12. This construction is desirable to permit the parts to accommodate themselves from time to time to the different positions made necessary by the movement and jolting of the vehicle, and because of any inconvenience in the construction of the rear wheels. As an additional feature of invention, a crank 22 may be applied at one end of the shaft 12 and this crank turned manually or otherwise upon occasions when the vehicle becomes stuck.

Sundry changes in the details of construction may be made without departing from the scope of the invention.

I claim as my invention:

1. A vehicle provided with front and rear wheels, a shaft having rollers at its ends adapted to engage the rear wheels, a tongue or shaft upon which the motive power is adapted to be exerted, and means extending from said roller-bearing shaft to the tongue, whereby the effect of the motive power is communicated to said roller-bearing shaft and applied therethrough to said rear wheels.

2. A vehicle provided with front and rear wheels, a shaft having rollers at its ends adapted to engage the rear wheels, a tongue or shaft upon which the motive power is adapted to be exerted, and flexible means extending from said roller-bearing shaft to the tongue, whereby the effect of the motive power is communicated to said roller-bearing shaft and applied therethrough to said rear wheels.

3. A vehicle provided with front and rear wheels, a shaft having rollers at its ends adapted to engage the rear wheels, a tongue or shaft upon which the motive power is adapted to be exerted, and a flexible member secured at its ends to said roller-bearing shaft, and adjacent its middle to the tongue, said flexible member being adapted to communicate the motive power exerted upon said tongue to said roller-bearing shaft.

4. A vehicle provided with front and rear wheels, a shaft having rollers at its ends adapted to engage the rear wheels, a stirrup secured to the vehicle in which said shaft is slidably mounted, a tongue upon which the motive power is adapted to be exerted, and a flexible member secured to said roller-bearing shaft and connected to the tongue, said flexible member being adapted to communicate the motive power exerted upon said tongue to said roller-bearing shaft.

5. A vehicle provided with front and rear wheels, a shaft having rollers at its ends adapted to engage the rear wheels, a tongue or shaft upon which the motive power is adapted to be exerted, a flexible member secured at its ends to said roller-bearing shaft, a pulley in connection with the tongue over which pulley said flexible member is adapted to pass, said flexible member being adapted to communicate the motive power exerted upon said tongue to said roller-bearing shaft and to said rear wheels.

6. A vehicle provided with front and rear wheels, a shaft having rollers at its ends adapted to engage the rear wheels, a tongue or shaft upon which the motive power is adapted to be exerted, a flexible member secured at its ends to said roller-bearing shaft, a pulley in connection with the tongue over which pulley said flexible member is adapted to pass, said flexible member being adapted to communicate the motive power exerted upon said tongue to said roller-bearing shaft and to said rear wheels, and a stirrup secured to the vehicle, said stirrup being adapted to support said roller-bearing shaft.

In testimony whereof I hereunto affix my signature in the presence of two witnesses.

JOSEPH HAGEL.

Witnesses:
MAY D. FLYNN,
ROBT. KLOTZ.